United States Patent
Luo et al.

(10) Patent No.: US 7,321,898 B1
(45) Date of Patent: Jan. 22, 2008

(54) LOCKING MECHANISM FOR MATERIALIZED VIEWS IN A DATABASE SYSTEM

(75) Inventors: Gang Luo, Madison, WI (US); Michael W. Watzke, Madison, WI (US); Curt J. Ellmann, Madison, WI (US); Jeffrey F. Naughton, Madison, WI (US)

(73) Assignee: NCR Corp., Dayton, OH (US)

( * ) Notice: Subject to any disclaimer, the term of this patent is extended or adjusted under 35 U.S.C. 154(b) by 476 days.

(21) Appl. No.: 10/844,680

(22) Filed: May 13, 2004

Related U.S. Application Data

(63) Continuation-in-part of application No. 10/349,855, filed on Jan. 23, 2003, now Pat. No. 7,174,331, which is a continuation-in-part of application No. 10/324,456, filed on Dec. 20, 2002, now Pat. No. 7,181,452, which is a continuation-in-part of application No. 10/117,497, filed on Apr. 4, 2002, now Pat. No. 7,149,737.

(51) Int. Cl.
*G06F 7/00* (2006.01)

(52) U.S. Cl. .................................... 707/102

(58) Field of Classification Search ............. 707/1–10, 707/100 S, 102
See application file for complete search history.

(56) References Cited

U.S. PATENT DOCUMENTS

| | | | |
|---|---|---|---|
| 5,261,069 A | 11/1993 | Wilkinson et al. .......... 395/425 |
| 5,440,732 A * | 8/1995 | Lomet et al. .................. 707/1 |
| 5,878,410 A * | 3/1999 | Zbikowski et al. ............. 707/2 |
| 5,983,215 A | 11/1999 | Ross et al. |
| 6,353,828 B1 * | 3/2002 | Ganesh et al. ................. 707/8 |
| 6,353,835 B1 | 3/2002 | Lieuwen |
| 6,470,360 B1 * | 10/2002 | Vaitheeswaran ............ 707/205 |
| 6,581,205 B1 * | 6/2003 | Cochrane et al. ........... 717/140 |
| 6,606,626 B1 * | 8/2003 | Ponnekanti ..................... 707/8 |
| 6,668,295 B1 | 12/2003 | Chan |
| 6,687,709 B2 | 2/2004 | Williams |
| 6,709,195 B2 | 3/2004 | Borman et al. |
| 6,754,656 B1 | 6/2004 | Cornwell et al. |
| 2003/0078922 A1 * | 4/2003 | Pham et al. .................... 707/4 |
| 2003/0177131 A1 * | 9/2003 | Yamashita et al. .......... 707/100 |

OTHER PUBLICATIONS

Goetz Graefe and Michael Zwilling. "Transaction Support for Indexed Summary Views." SIGMOD 2004, Paris France.—provided in a previous Office Action.*

(Continued)

*Primary Examiner*—Kimberly Lovel
(74) *Attorney, Agent, or Firm*—Trop, Pruner & Hu PC

(57) ABSTRACT

A database system receives a transaction that causes a tuple to be integrated into a join view. In response to receiving the transaction, a predefined first lock is placed on at least a portion of the join view, the predefined first lock conflicting with either a shared lock or an exclusive lock placed on the join view, but not conflicting with another predefined first lock placed on the join view. Also, a latch or semaphore associated with a value of a predetermined attribute of the tuple is obtained before integrating the tuple into the join view.

24 Claims, 8 Drawing Sheets

OTHER PUBLICATIONS

Dallan Quass and Jenifer Widom. "On-Line Warehouse View Maintenance." SIGMOND 1997: AZ, USA.—provided in a previous Office Action.*

Rick Grehan, "How to Climb a B-tree, a popular tree-indexing structure, is perfect for db4o database system, and can save you a lot of disk access time," printed from http://www.fawcette.com, 25 pages (2002).

Kevin Jones, "TPFD B+Tree Indexing Support," printed from http://www-3.ibm.com, pp. 1-3 (dated at least as early as Jan. 8, 2003).

SAP Library-User Manual: SAP DB, "B*Tree," printed from http://pipin.tmd.ns.ac.yu, pp. 1-2 (dated at least as early as Jan. 8, 2003).

J. Gehrke, et al. "On Computing Correlated Aggregates over Continual Data Streams." SIGMOD Conf. pp. 13-24 (2001).

J. Gray, et al., "Granularity of Locks and Degrees of Consistency in a Shared Data Base." IFIP Working Conference on Modeling in Data Base Management Systems, pp. 365-394 (1976).

J. Gray, et al., "Transaction Processing: Concepts and Techniques." Morgan Kaufmann Publishers, pp. 403-406, 409-414, 419, 428, 429, 456-458, 464-481, 848-851, 868-872 (1993).

A. Kawaguchi, et al, "Concurrency Control Theory for Deferred Materialized Views." ICDT, pp. 306-320 (1997).

M. Kornacker, et al., "Concurrency and Recovery in Generalized Search Trees." SIGMOD Conf., pp. 67-72 (1997).

H.F. Korth "Locking Primitives in a Database System." JACM 30(1), pp. 55-79 (1983).

C. Mohan, et al., "ARIES/IM: An Efficient and High Concurrency Index Management Method Using Write-Ahead Logging." SIGMOD Conf., pp. 371-380 (1992).

C. Mohan "ARIES/KVL: A key-Value Locking Method for Concurrency Control of Multiaction Transactions Operating on B-Tree Indexes." VLDB, pp. 392-405, (1990).

C. Mohan "Commit_LSN: A Novel and Simple Method for Reducing Locking and Latching in Transaction Processing Systems." VLDB, pp. 406-418 (1990).

C. Mohan, "ARIES/LHS: A Concurrency Control and Recovery Method Using Write-Ahead Logging for Linear Hashing with Separators." ICDE, pp. 243-252 (1993).

R.F. Resende et al., "Sematic Locking in Object-Oriented Database Systems," OOPSLA 1994: 388-402.

G. Luo et al., "Looking Protocols for Materialized Aggregate Join View," VLDB 2003.

G. Luo et al., "A Comparison of Three Methods for Join View Maintenance in Parallel RDBMS," ICDE 2003: 177-188.

D.B. Lomet, "Key Range Locking Strategies for Improved Concurrency," VLDB 1993: 655-664.

B.R. Badrinath et al, "Semantics-Based Concurrency Control: Beyond Commutativity," TODS pp. 163-199 (1992).

D. Gawlick et al., "Varieties of Concurrency Control in IMS/VS Fast Path," Database Engineering Bulletin, pp. 3-10 (1985).

W. Labio et al., "Performance Issues in Incremental Warehouse Maintenance," VLDB pp. 461-472 (2000).

P.E. O'Neil, "The Escrow Transactional Method," TODS pp. 405-430 (1986).

M. Poess et al. "New TPC Benchmarks for Decision Support and Web Commerce," SIGMOD pp. 64-71 (2000).

A. Reuter, "Concurrency on High-traffic Data Elements," PODS, pp. 83-92 (1982).

A. Silberschatz et al., "Consistency in Hierarchical Databases Systems," JACM, pp. 72-80 (1980).

* cited by examiner

LOCKING MECHANISM FOR MATERIALIZED VIEWS IN A DATABASE SYSTEM

CROSS REFERENCE TO RELATED APPLICATIONS

This is a continuation-in-part of U.S. Ser. No. 10/349,855, filed Jan. 23, 2003, now U.S. Pat. No. 7,174,331, which is a continuation-in-part of U.S. Ser. No. 10/324,456, filed Dec. 20, 2002, now U.S. Pat. No. 7,181,452, which is a continuation-in-part of U.S. Ser. No. 10/117,497, filed Apr. 4, 2002, now U.S. Pat. No. 7,149,737.

BACKGROUND

A database is a collection of stored data that is logically related and that is accessible by one or more users. A popular type of database is the relational database management system (RDBMS), which includes relational tables made up of rows and columns. Each row represents an occurrence of an entity defined by a table (or relation), with an entity being a person, place, or thing about which the relation contains information.

Various data structures are typically associated with relations in a relational database system. For example, a view is a derived relation formed by performing a function on one or more base relations. Rather than storing the view, the function is typically recomputed each time the view is referenced. This type of view is referred to as an "ordinary view."

Unlike an ordinary view, a materialized view is a precomputed, stored query result that can be used for some queries instead of reconstructing the results directly from the base relations. As with the ordinary view, a function is performed on the base relations to derive the materialized view. However, because the materialized view is stored, fast access to the data is possible without recomputing the view.

After the materialized view is created, subsequent queries are able to use the materialized view, where appropriate, to increase query processing speed. Materialized views can be used to assemble data that come from many different relations.

A materialized view is updated when the underlying base relations are modified. As the base relations are changed through insertion of new tuples, deletion of tuples, or updates to existing tuples, the corresponding rows in the materialized view are changed to avoid becoming stale. This is known as materialized view maintenance.

Relational database systems can be used for data warehouse applications. A data warehouse collects information from several source databases. The collected information is integrated into a single database to be queried by the data warehouse clients. Traditionally, data warehouses have been archival stores used for analysis of historical data. More recently, however, there has been a growing trend to use a data warehouse operationally (referred to as a "operational data warehouse" or "real-time data warehouse"), which involves making relatively real-time decisions about data stored in the data warehouse.

Traditional techniques of maintaining views are usually inadequate (in terms of processing speed) for operational data warehouses due to the real-time update requirements. Furthermore, materialized view maintenance in an operational data warehouse requires transactional consistency. If transactional consistency is enforced by traditional concurrency control mechanisms (including locking mechanisms), the ability of the database system to perform concurrent transactions may be reduced. This hurts performance in a database system, especially in a parallel database system having multiple processing modules.

When a base relation is updated (e.g., new row inserted, existing row deleted, or row modified), the update needs to be propagated to a materialized view as part of the materialized view maintenance. In some systems, to increase operational speeds, reduced levels of consistency are used that allow "dirty reads," which are reads of stale data in relations. However, when such reduced levels of consistency are used in an environment in which materialized views are present, inconsistent query results are often obtained as a result of inaccurate data being captured in materialized views.

One type of materialized view is a join view, which contains results of a query that joins two or more base relations. A join view can be an aggregate join view, which stores join results of a join of multiple base relations, with the join results grouped by one or more grouping attributes, and with the grouped rows aggregated on one or more attributes. The addition of a materialized aggregate join view can introduce many lock conflicts and/or deadlock situations that would not have arisen in the absence of the materialized aggregate join view.

SUMMARY

In general, methods and apparatus are provided to improve concurrency control in a database system in which materialized views are maintained. For example, a method for use in a database system includes receiving a transaction that causes a tuple to be integrated into a join view. In response to receiving the transaction, a predefined first lock is placed on at least a portion of the join view, the predefined first lock conflicting with either a shared lock or an exclusive lock placed on the join view, but not conflicting with another predefined first lock placed on the join view. Also, a latch associated with a value of a predetermined attribute of the tuple is obtained before integrating the tuple into the join view.

Other or alternative features will become more apparent from the following description, from the drawings, and from the claims.

DETAILED DESCRIPTION

I. Introduction

Figure 1:
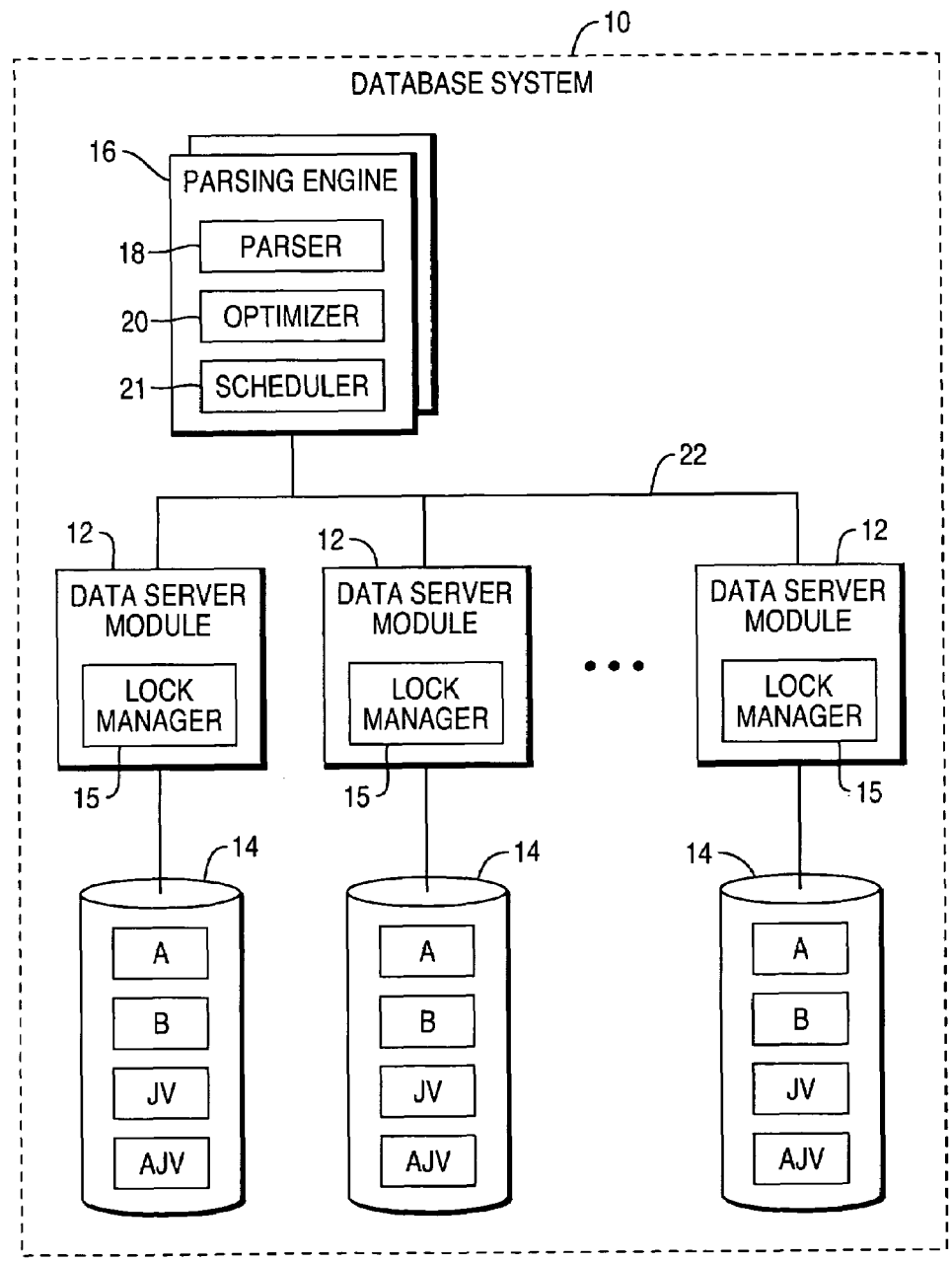
FIG. 1 is a block diagram of an example database system that incorporates a locking mechanism according to some embodiments.

In the following description, numerous details are set forth to provide an understanding of the present invention. However, it will be understood by those skilled in the art that the present invention may be practiced without these details and that numerous variations or modifications from the described embodiments are possible.

In accordance with some embodiments of the invention, a locking mechanism for materialized views is provided in a relational database management system. One form of materialized view is the join view, which is a view that stores and maintains the result of a join of multiple base relations (also referred to as "base tables"). A special form of join view is an aggregate join view. To address concurrency issues associated with maintenance of aggregate join views in a database system, the locking mechanism according to some embodiments of the invention employ "Y-lock" locking mechanism (also referred to as a "V-lock" locking mechanism) in addition to a latch pool mechanism.

The following provides an example query for creating a join view (JV) on two base relations (A, B):

CREATE JOIN VIEW JV AS
SELECT *
FROM A, B
WHERE A.c=B.d
PARTITIONED ON A.e;

The join view JV includes tuples (also referred to as "rows") of base relations A and B where the attributes (also referred to as "columns") A.c and B.d are equal. The join view JV is partitioned on the attribute A.e. In other examples, a join view can be stored for a join of more than two base relations.

An aggregate join view stores join results of a join of multiple base relations, with the join results grouped by one or more grouping attributes, and with the grouped rows aggregated on one or more attributes. As one example, an aggregate join view can be created as follows:

CREATE AGGREGATE JOIN VIEW AJV AS
SELECT A.a, SUM (A.b)
FROM A, B
WHERE A.c=B.d
GROUP BY A.a;

The grouping attribute specified by the GROUP BY clause in the example query is A.a. This causes rows of the join result to be grouped according to different values of A.a. The aggregate operator specified in the example query is SUM, which causes the A.b values of the rows that are combined into each group to be summed.

There are various different types of locks that can be placed on data stored in relational tables to restrict access to or the ability to modify the data. Table-level locks are placed on an entire table or relation. Table-level locks include a table-level shared (S) lock and a table-level exclusive (X) lock. Generally, once placed on a table, a table-level S lock blocks a subsequent transaction that attempts to write to any part of the table. A table-level X lock placed on a table is more restrictive, as it blocks any subsequent transaction that attempts to read from or write to any part of the table.

While a table-level locking mechanism locks an entire table, a value locking mechanism locks only a portion of the table. The value locking mechanism specifies a value (or values) of an attribute(s) in a table for which locks are to be placed. Such an attribute, or attributes, is referred to as a value locking attribute, or value locking attributes. A value locking mechanism usually locks only one row or a few rows.

Value locks include a shared (S) value lock and an exclusive (X) value lock. To place an X value lock on an attribute value of a base relation R, a table-level intention exclusive (IX) lock is first placed on R. Similarly, to place an S value lock on an attribute value of the base relation R, a table-level intention shared (IS) lock is first placed on R.

A table-level IX lock is placed on a relation to prevent any subsequent table-level X or S locks on the same relation. The IX lock is a mechanism for the database system to efficiently determine whether a subsequent table-level X or S lock can be placed, without having to find out if there is a conflicting value lock on the relation. For example, suppose the value locking attribute of a relation R is attribute R.a. There can potentially be multiple value locks placed on multiple values of R.a. Thus, a first X value lock can be placed on row(s) of the relation R with R.a=5, a second X value lock can be placed on row(s) of relation R with R.a=2, and so forth. If a subsequent transaction attempts to read the entire relation R, the subsequent transaction will need to acquire a table-level S lock. One way to determine if the table-level lock S lock can be granted is by finding each R.a value for which there is an X value lock. However, this is inefficient. Instead, according to some embodiments, a table-level IX lock is placed on the relation R if there is at least one X value lock on the base relation R. Thus, to determine if the table-level S lock can be placed on the relation R, the database system can quickly detect that there is already an IX lock placed on the relation R, which blocks acquisition of the table-level S lock. Note that only one IX lock is needed for multiple X value locks of a relation. The IX lock also blocks any subsequent table-level X lock.

Similarly, a table-level IS lock placed on a relation R for an S value lock blocks any subsequent table-level X lock.

If a transaction T attempts to update base relation R, the transaction has two choices: (1) T can place a table-level X lock on base relation R; or (2) T can place an IX lock on R and an X value lock on some value locking attribute of R. Similarly, if transaction T attempts to read base relation R, transaction T also has two choices: (1) T can place a table-level S lock on R; or (2) T can place an IS lock on R and an S value lock on some value locking attribute of R.

II. Example Database System Arrangement

FIG. 1 shows an example arrangement of a database system 10 that stores base relations (e.g., A, B), join views (JV), and aggregate join views (e.g., AJV). The database system 10 is a parallel database system having a plurality of data server modules 12. Each data server module 12 is responsible for managing the access to or modification of data stored in a respective storage module 14. Examples of the responsibilities of each data server module (also referred to as "an access module") include locking databases, tables, or portions of tables; creating, modifying, or deleting definitions of tables; inserting, deleting, or modifying rows within tables; and retrieving information from definitions and tables. The data server modules, after executing an action, also return responses to a requesting client. In one example implementation, the data server modules 12 are based on access module processors (AMPs) in TERADATA® database systems from NCR Corporation.

According to one embodiment, each data server module 12 includes a lock manager 15 to provide a locking mechanism according to some embodiments of the invention. Thus, the lock manager 15 is responsible for placing locks (e.g. table-level locks or value locks) on base relations and join views. As shown, the locking mechanism is distributed across plural data server modules 12. Alternatively, a centralized lock manager is employed.

In one embodiment, the requesting client that sends commands to the data server modules 12 include one or more parsing engines 16. The parsing engine(s) 16 receive requests from users or applications, which are in the form of queries according to a standard database query language (such as a Structured Query Language or SQL, as provided by the American National Standards Institute or ANSI). In other embodiments, other types of database query languages can be used.

Each parsing engine 16 includes a parser 18 and an optimizer 20. The parser 18 checks a received request for proper syntax and semantically evaluates the request. The optimizer 20 develops an execution plan for the received request. In some embodiments, the optimizer 20 uses a cost-based mechanism to select a least expensive (in terms of system resources utilized) execution plan for the query.

The execution plan includes a series of "steps" that are communicated to one or more of the data server modules 12 over a communications network 22. If the execution plan can be executed by one data server module 12, then the parsing engine 16 sends the one or more steps of the execution plan to the one data server module 12. However, if plural data server modules 12 are involved in the execution plan, the parsing engine 16 sends the step(s) to the plural data server modules 12. The sequence in which steps of an execution plan are executed is controlled by a scheduler 21 in the parsing engine 16.

In the example shown in FIG. 1, base relations A and B are stored in plural storage modules 14 associated with corresponding data server modules 12. Each base relation A or B is partitioned into plural partitions based on one or more selected attributes (referred to as the primary index) of the base relation. Each partition stored on a respective storage module 14 includes a subset of all the rows of the base relation. The join view (JV) and aggregate join view (AJV) are also partitioned across the plurality of storage modules 14.

Although the storage modules 14 are shown as separate modules, they can be part of the same storage subsystem. Alternatively, the storage modules 14 can be separate storage devices. In another embodiment, instead of plural data server modules 12, the database system 10 can include only one data server module 12. The locking mechanism according to the various embodiments can be applied to a single-data server module database system rather than the multiple-data server module database system shown in FIG. 1.

III. Y-Lock Locking Mechanism

In accordance with some embodiments of the invention, the locking mechanism provided for the join view is a "Y-lock" locking mechanism (also referred to as a "V-lock" locking mechanism). A join view can be either an aggregate join view or a non-aggregate join view. A Y lock has similar functionality as an X lock, with the major difference being that the Y lock does not conflict with itself. In other words, the Y lock is a modified type of exclusive lock placed on a join view that allows subsequent Y locks to be placed on the same join view even though a first Y lock is still active on the join view. In contrast, a table-level X lock placed on a join view blocks a subsequent X lock on the same join view. By enabling multiple Y locks to be concurrently placed on the same join view, throughput of transactions in the database system 10 can be greatly increased, as the possibility of lock conflicts on the join views among different transactions is reduced. A Y lock is also referred to as a "modified-exclusive" lock.

Thus, in addition to table-level X and S locks, table-level Y locks can also be placed on a join view. Although reference is made to a join view, note that the Y-lock locking mechanism can also be applied to an aggregate join view (AJV). The compatibilities among the X, S, and Y locks are indicated by the table below.

TABLE 1

|   | Y | S | X |
|---|---|---|---|
| Y | yes | no | no |
| S | no | yes | no |
| X | no | no | no |

Figure 2:
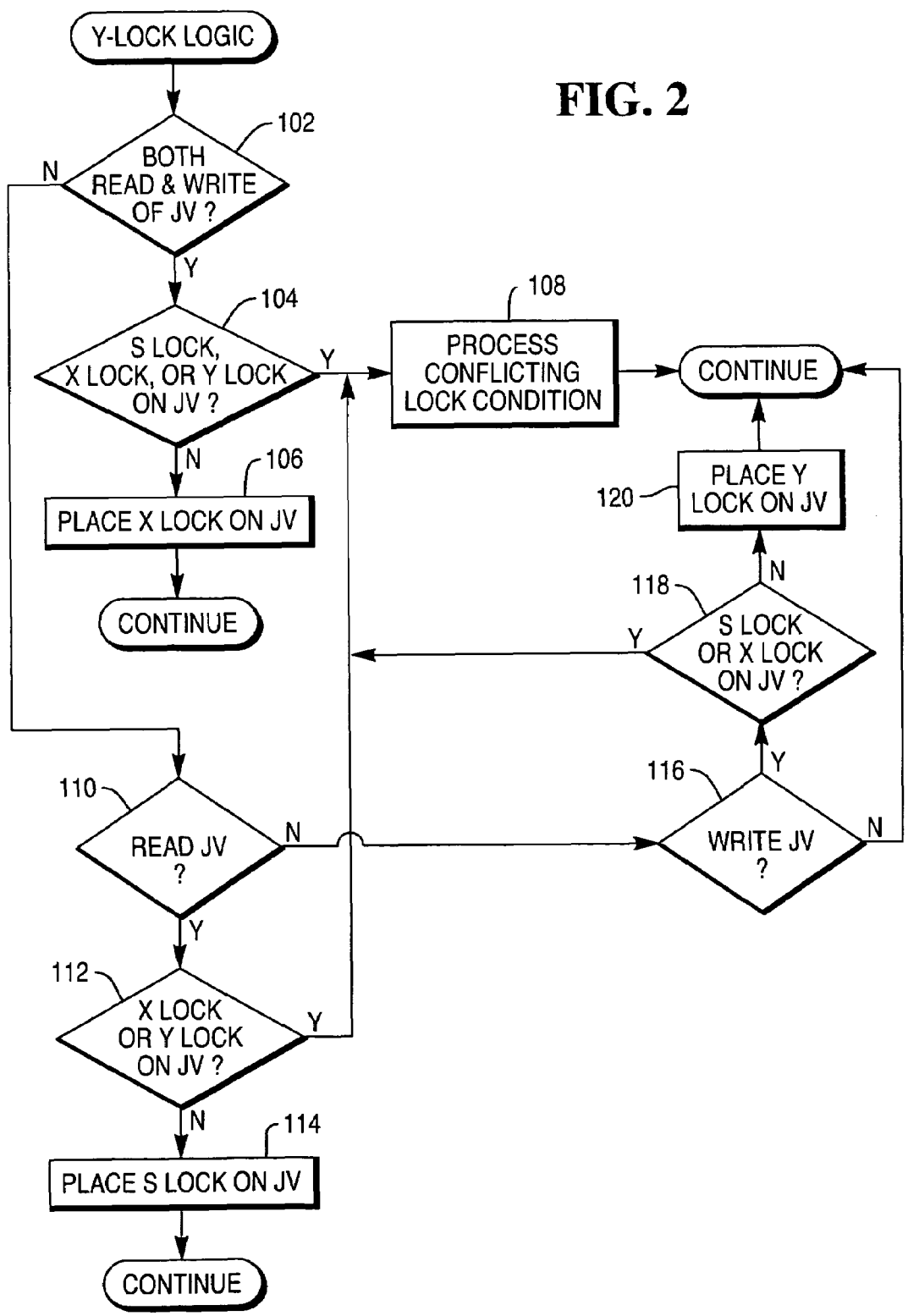
FIG. 2 is a flow diagram of logic for a Y-lock locking mechanism for join view maintenance.

The conditions under which such table-level locks are allowed are shown by the logic of FIG. 2. The logic shown in FIG. 2 is performed by a data server module 12 in the database system 10 of FIG. 1. If more than one data server module 12 is involved in a particular transaction, then each data server module 12 performs the acts of FIG. 2 concurrently.

Upon receiving steps associated with a transaction, the data server module 12 first determines (at 102) if the transaction specifies both a read and write of the join view JV. As used here, writing a view is also referred to as updating or modifying the view. If the transaction specifies both a read and write of JV, then the data server module 12 determines (at 104) if an S lock, X lock, or Y lock is currently active on the join view JV. If none of an S lock, X lock, or Y lock is active on the join view JV, the data server module 12 places (at 106) an X lock on the join view JV. Note that the X lock required for the received transaction conflicts with any of an X lock, S lock, or Y lock, so that the presence of any such table-level lock on JV blocks the required X lock for the received transaction.

If the data server module 12 determines (at 104) that any of the S lock, X lock, or Y lock is active on JV, the data server module 12 performs (at 108) conflicting lock processing. For example, the data server module 12 can wait until the current conflicting lock has been released. Different embodiments perform different tasks in response to detecting that a received transaction cannot proceed because of conflicting locks placed on the join view JV.

If the transaction is determined not to involve both a read and write of the join view JV (at 102), the data server module 12 checks (at 110) if the transaction involves a read (but not a write) of the join view. If so, the data server module 12 checks (at 112) if there is either a Y lock or an X lock on JV. If neither a Y lock nor X lock is currently active on JV, the data server module 12 places (at 114) an S lock on the join view JV. Note that the required S lock conflicts with either a Y lock or X lock, so that the presence of either the Y lock or X lock blocks acquisition of the S lock for the received transaction. If either a Y lock or X lock is presently active on JV, the data server module 12 processes (at 108) the conflicting lock condition.

If the transaction does not involve a read of the join view JV, the data server module checks (at 116) if the transaction involves a write (but not a read) of the join view JV. If so, the data server module 12 checks (at 118) if there is either an S lock or an X lock on JV. If not, then the data server module 12 places (at 120) a Y lock on the join view JV. However, if either an S lock or an X lock is presently active on JV, the data server module 12 processes (at 108) the conflicting lock condition.

The discussion above refers to placing a table-level Y lock on a join view. The Y-lock locking mechanism for join views is extendable to also allow value locks on join views. Consider a join view JV defined on base relations $R_1$, $R_2, \ldots,$ and $R_n$. For a fixed i ($1 \leq i \leq n$), suppose that $R_i.a_i$ is an attribute of base relation $R_i$ that also appears in JV. Then X, Y, and S value locking on $R_i.a_i$ for JV is allowed. For example, consider a transaction T that only updates base relation $R_i$. If the update to base relation $R_i$ specifies the value(s) of $R_i.a_i$, then transaction T can also place an IY lock on JV and one or several Y value locks on $R_i.a_i$ for JV. If transaction T reads JV by specifying the $R_i.a_i$ value(s), then transaction T can put an IS lock on JV and one or several S value locks on $R_i.a_i$ for JV. If transaction T both reads and updates JV by specifying the $R_i.a_i$ value(s), then transaction T can put an IX lock on JV and one or several S value locks, Y value locks, and X value locks on $R_i.a_i$ for JV.

The IY lock is similar to the traditional IX lock except that it is compatible with a Y lock or another IY lock. As with the IX lock, the table-level IY lock is placed on the join view JV in conjunction with an Y value lock of JV to indicate to subsequent transactions that table-level X or S locks on JV are blocked (however, a table-level Y or IY lock on JV is still possible in the presence of the IY lock with Y value lock). Also, a subsequent IS lock with an S value lock on JV is allowed in the presence of an IY lock with Y value lock on JV.

For a transaction that performs both a (table-level) read and (value) write of the join view JV, both an S lock and X value lock are needed on the join view JV. In this case, a table-level SIY lock (which is equivalent to an S lock and an IY lock) is placed on JV. The SIY lock is similar to the traditional SIX lock. One can think that IX=IS+IY. An SIX lock is equivalent to an S lock and an IX lock (for an X value lock). The SIY lock is only compatible with the IS lock.

Note that SIX=S+IX=S+(IS+IY)=(S+IS)+IY=S+IY=SIY. Thus, the SIX lock is the same as the SIY lock.

If transaction T both updates JV (without specifying the $R_i.a_i$ value(s)), which is a table-write, and reads JV (specifying the $R_i.a_i$ value(s)), which is a value-read, then transaction T requires both a Y lock and S value lock(s) on JV. In this case, a table-level YIS lock is played on JV (which is equivalent to a Y lock and an IS lock). The YIS lock (Y+IS) is similar to the SIX lock and is only compatible with the IY lock.

The compatibilities of the different locks are listed in Table 2.

TABLE 2

|     | Y   | S   | X   | IS  | IY  | IX  | SIY | YIS |
| --- | --- | --- | --- | --- | --- | --- | --- | --- |
| Y   | yes | no  | no  | no  | yes | no  | no  | no  |
| S   | no  | yes | no  | yes | no  | no  | no  | no  |
| X   | no  | no  | no  | no  | no  | no  | no  | no  |
| IS  | no  | yes | no  | yes | yes | yes | yes | no  |
| IY  | yes | no  | no  | yes | yes | yes | no  | yes |
| IX  | no  | no  | no  | yes | yes | yes | no  | no  |
| SIY | no  | no  | no  | yes | no  | no  | no  | no  |
| YIS | no  | no  | no  | no  | yes | no  | no  | no  |

According to Table 2, a Y lock on JV is compatible with another Y lock or an IY lock on JV. However, the Y lock is incompatible with a table-level S lock, X lock, IS lock, IX lock, SIY lock, or YIS lock. Note that a table-level X lock is incompatible with any lock. An IY lock on JV is compatible with a table-level Y lock, IS lock, IY lock, IX lock, or YIS lock. However, an IY lock is incompatible with a table-level S lock, X lock, and SIY lock. An IX lock is compatible with an IS, IY, or IX lock, but not with any other locks. An SIY lock (S+IY lock) is compatible with an IS lock, but not with any other locks. A YIS lock (Y+IS lock) is compatible with an IY lock, but not with any other locks.

Figure 3:
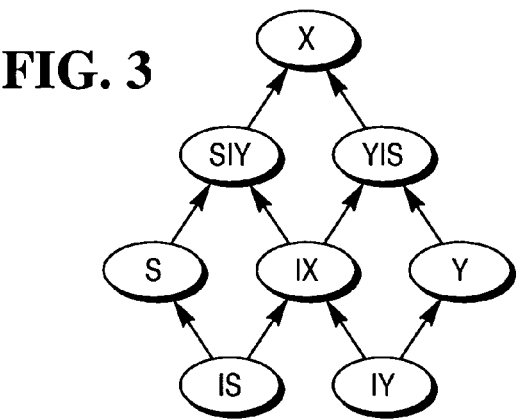
FIG. 3 illustrates a lock conversion lattice.

A lock conversion lattice is shown in FIG. 3. The top of the lattice is a node corresponding to the strongest lock available in the database system—the X lock. The bottom of the lock conversion lattice has nodes corresponding to the two weakest locks—the IS lock and the IY lock. If a lock is held in one mode (corresponding to one of the nodes of the lock conversion lattice) and requested in a second mode, then the locking mode is converted to the maximum of the two modes in the lock conversion lattice. The possible transitions between the locking modes are indicated by the arrows in FIG. 3.

The Y-lock locking mechanism also applies to any single-table materialized view MV defined on base relation R as $MV=\pi(\sigma(R))$ and any single-table aggregate materialized view AMV defined on base relation R as $AMV=\gamma(\pi(\sigma(R)))$. $\sigma$ denotes a selection operator, $\pi$ denotes a projection operator, and $\gamma$ denotes an aggregate operator.

IV. Latch Pool Mechanism

Using the Y-lock locking mechanism, multiple transactions are able to update the same tuple in an aggregate join view AJV simultaneously. In some cases, the ability of multiple transactions being able to simultaneously update an aggregate join view leads to an undesirable phenomenon, referred to as a "split group duplicate problem." For example, consider the following two transactions T and T'. Each transaction inserts a new tuple into a base relation of AJV and generates a join result tuple. If both join result tuples have the same group by attribute(s) value (group by attribute(s) refer to the attribute(s) in the GROUP BY clause of the aggregate join view definition), then both join result tuples should be aggregated into the same tuple in the aggregate join view AJV.

However, if Y locking is employed, it may be possible to integrate these two new tuples into the aggregate join view AJV as two separate tuples, even though the two new tuples should be combined as one tuple and inserted into the aggregate join view. For example, this may happen when the aggregate join view AJV is stored in a hash file in which a Y value lock (or a table-level Y lock) instead of an X value lock (or a table-level X lock) is used.

The creation of two tuples in the AJV for the same aggregate group is referred to as the split group duplicate problem.

The following describes an example of the split group duplicate problem. Suppose the schema of the aggregate join view AJV is (a, SUM(b)), where attribute a is the value locking attribute. The aggregate join view AJV is stored in a hash file where attribute a is the hash key. Suppose originally the aggregate join view AJV contains tuple (20, 2) and several other tuples. However, there is no tuple whose attribute a=1 in the aggregate join view AJV. Consider the following three transactions T, T', and T". Transaction T inserts a new tuple into a base relation R of AJV and generates the join result tuple (1, 1) that needs to be integrated into AJV. Transaction T' inserts another new tuple into the same base relation R of AJV and generates the join result tuple (1, 2) that needs to be integrated into AJV. Transaction T" deletes a third tuple from base relation R of AJV so that tuple (20, 2) needs to be deleted from AJV.

Figure 4:
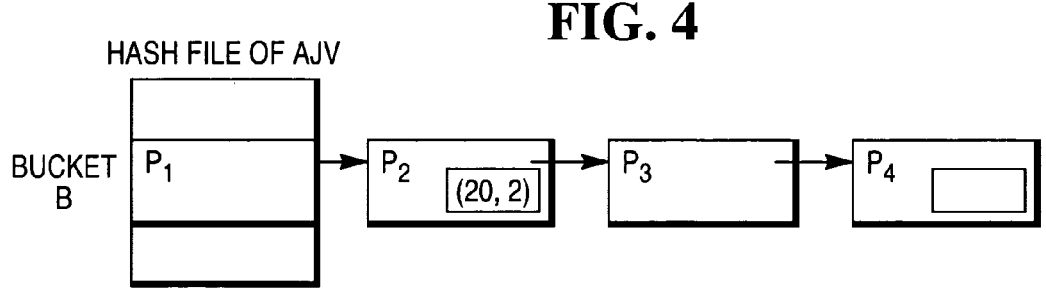
FIGS. 4-7 illustrate pages of a hash file.

After executing these three transactions, tuple (20, 2) should be deleted from AJV while tuple (1, 3) should be inserted into AJV. Suppose 20 and 1 have the same hash value so that tuple (20, 2) and tuple (1, 3) are stored in the same bucket B of the hash file. Suppose there are four pages in bucket B: one bucket page $P_1$ and three overflow pages $P_2$, $P_3$, and $P_4$. All these pages are linked together as illustrated in FIG. 4. Pages $P_1$, $P_2$, and $P_3$ are full and there is no open slot there. There are several open slots in page $P_4$.

Using Y value locks, transactions T, T', and T" may be executed in the following manner. Transaction T gets a Y value lock for attribute a=1 on AJV. Transaction T applies the hash function to attribute a=1 to find the corresponding hash table bucket B. Transaction T crabs all the pages in bucket B to see whether a tuple $t_2$ whose attribute a=1 already exists in the hash file or not. After crabbing, transaction T finds that no such tuple $t_2$ exists. "Crabbing" refers to a procedure in which a transaction does not release a latch on one page until the transaction obtains a latch on the next page.

Transaction T' gets a Y value lock for attribute a=1 on AJV. Transaction T' applies the hash function to attribute a=1 to find the corresponding hash table bucket B. Transaction T' crabs all the pages in bucket B to see whether a tuple $t_2$ whose attribute a=1 already exists in the hash file or not. After crabbing, transaction T' finds that no such tuple $t_2$ exists.

Figure 5:
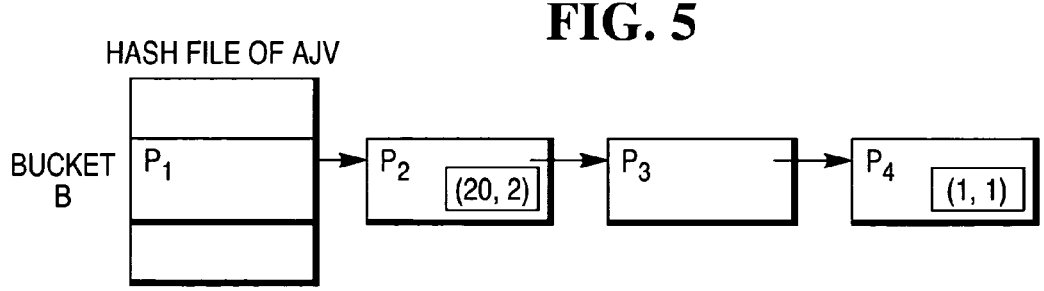

Transaction T crabs the pages in bucket B again. Transaction T finds that only page $P_4$ has enough free space. Transaction T inserts a new tuple (1, 1) into page $P_4$ (as shown in FIG. 5) for the join result tuple (1, 1). Transaction T commits and releases the Y value lock for attribute a=1 on AJV.

Figure 6:
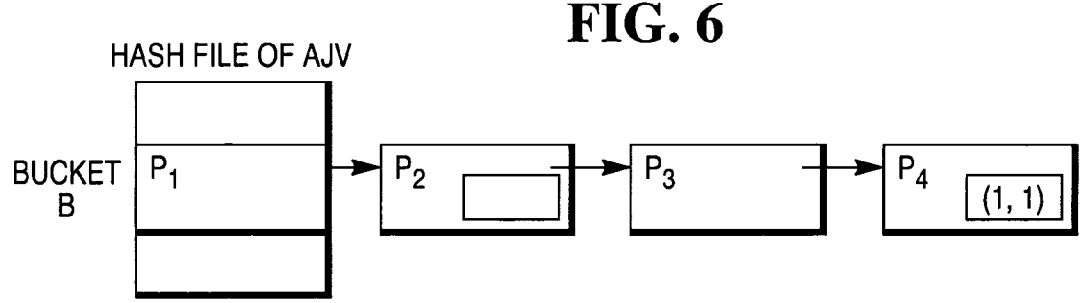

Transaction T" gets a Y value lock for attribute a=20 on AJV. Transaction T" finds that tuple (20, 2) is contained in page $P_2$. Transaction T" deletes tuple (20, 2) from page $P_2$ so that there is an open slot in page $P_2$ (see FIG. 6). Transaction T" commits and releases the Y value lock for attribute a=20 on AJV.

Figure 7:
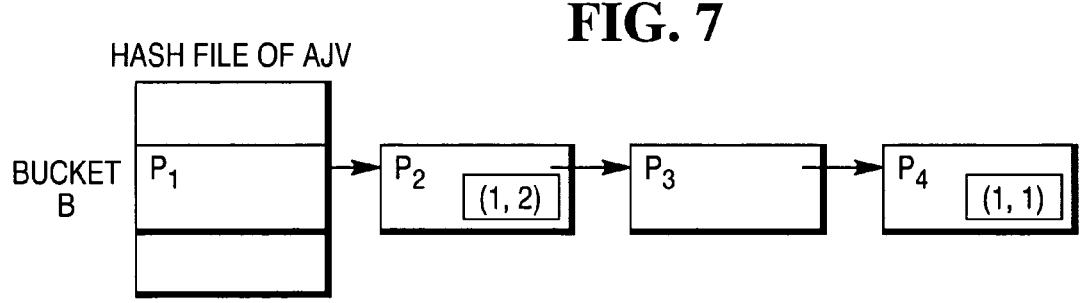

Transaction T' crabs the pages in bucket B again. Transaction T' finds that page $P_2$ has an open slot. Transaction T' inserts a new tuple (1, 2) into page $P_2$ (as shown in FIG. 7) for the join result tuple (1, 2). Transaction T' commits and releases the Y value lock for attribute a=1 on AJV.

As shown in FIG. 7, the aggregate join view AJV contains two tuples (1, 1) and (1, 2) instead of a single tuple (1, 3), which is not correct.

To solve the split group duplicate problem, the locking mechanism augments Y locks with a latch pool mechanism. The latch pool mechanism defines a pool of latches to ensure that the semantics of materialized aggregate can be maintained; in other words, at any time, for any aggregate group, either zero or one tuple corresponding to a given group exists in a materialized aggregate join view. Also, the probability of lock conflicts and deadlocks is greatly reduced, because latches are only held for a short period of time, and Y locks do not conflict with each other. Hence, the combination of Y locks and the latch pool solves the materialized aggregate join view update problem.

Traditionally, latches are used to protect the physical integrity of certain data structures (e.g., the data structures in a page) in a database system. However, in accordance with some embodiments of the invention, the latch pool is used to protect the logical, rather than physical, integrity of the database.

The latches in the latch pool guarantee that for each aggregate group, at any time, at most one tuple corresponding to this group exists in the aggregate join view. In the database system, a latch pool is pre-allocated that contains N number of X (exclusive) latches, where N>1. A latch is the same as a semaphore: it is a variable or flag placed in a designated storage area (such as in volatile memory) that is accessed by multiple processes or threads of software routines to determine whether a shared resource is available. A first state (active state) of the latch indicates that the shared resource (in this case, a tuple or group of tuples) is in use. A second state (inactive state) of the latch indicates that the shared resource is available.

A latch is designed to enable a process or thread (e.g., a data server module) to quickly determine whether a shared resource is available for access. In some implementations, the latch pool is stored in volatile memory (e.g., cache memory, system memory, etc.), rather than in non-volatile storage (e.g., hard disk drives) so that the content of the latch pool can be quickly accessed, since the access speeds of volatile memory are usually many orders of magnitude faster than the access speeds of non-volatile storage.

A latch (usually a relatively simple data structure) is intended to be placed for a relatively short period of time, whereas a lock is intended to be placed for a relatively long period of time. Locks are more complex structures than latches, and often, locks are built on top of latches. A further difference between a latch and a lock is that deadlock detection is not performed for latches, whereas the lock manager 15 (FIG. 1) performs deadlock detection for locks.

According to some embodiments, a latch pool of N latches is maintained. Each latch corresponds to a set of attribute values. A hash function H is used that maps any attribute value into an integer between 1 and N. Requesting or releasing a latch on attribute value v means requesting or releasing the H(v)-th latch in the latch pool. The hash function H(v) derives a pointer to a location in the pool corresponding to the desired latch. Thus, for example, if one requester is integrating a tuple having group-by attribute value $v_1$ into an aggregate join view AJV, the requester first obtains the $H(v_1)$-th latch in the pool, assuming that the $H(v_1)$-th latch is available (i.e., it is not currently being held by another requester). After integrating the tuple into AJV, the $H(v_1)$-th latch is released. While a requester is holding the $H(v_1)$-th latch, no other requester is able to integrate another tuple that has group-by attribute value $v_1$ into AJV. The latch, unlike the locks mentioned elsewhere here, is a short-term lock that can be quickly obtained and released. This enables a higher level of concurrency.

The following properties are defined for the latch pool of N latches:
(1) During the period that a transaction holds a latch in the latch pool, this transaction does not request another latch in the latch pool.
(2) To request a latch in the latch pool, a transaction must first release all the other latches in the database system (including those latches that are not in the latch pool) that the transaction current holds.
(3) During the period that a transaction holds a latch in the latch pool, this transaction does not request any lock.

Properties (1) and (2) guarantee that the latch pool mechanism does not introduce deadlocks between latches. Property (3) guarantees that the latch pool does not introduce deadlocks between latches and locks. These properties are defined since latches are not considered in deadlock detection.

The number N (of latches in the latch pool) influences the efficiency of Y-lock locking mechanism. However, the number N of latches does not influence the correctness of the Y-lock locking mechanism. The larger the number N, the less likely that due to hash conflicts (e.g., $H(v_1)=H(v_2)$), two transactions simultaneously request latches on two different key values $v_1$ and $v_2$ but only one such request is granted. However, this number N cannot be infinite. This is because for efficiency purpose, the entire latch pool should be stored in volatile (high-speed) memory. In practice, if a good hash function is used, and the number N is sufficiently larger than the number of concurrently running transactions in the database system, then the probability of hash conflicts should be low.

While holding a latch in the latch pool, I/O cycles are allowed to be performed. This violates the rule according to which latches are usually used. However, in accordance with some embodiments, each latch in the latch pool is of a relatively fine granularity: each latch protects only one (in the absence of hash conflicts) or multiple aggregate groups (in the presence of hash conflicts) in the aggregate join view rather than one or multiple pages (which are larger data structures).

Figure 8:
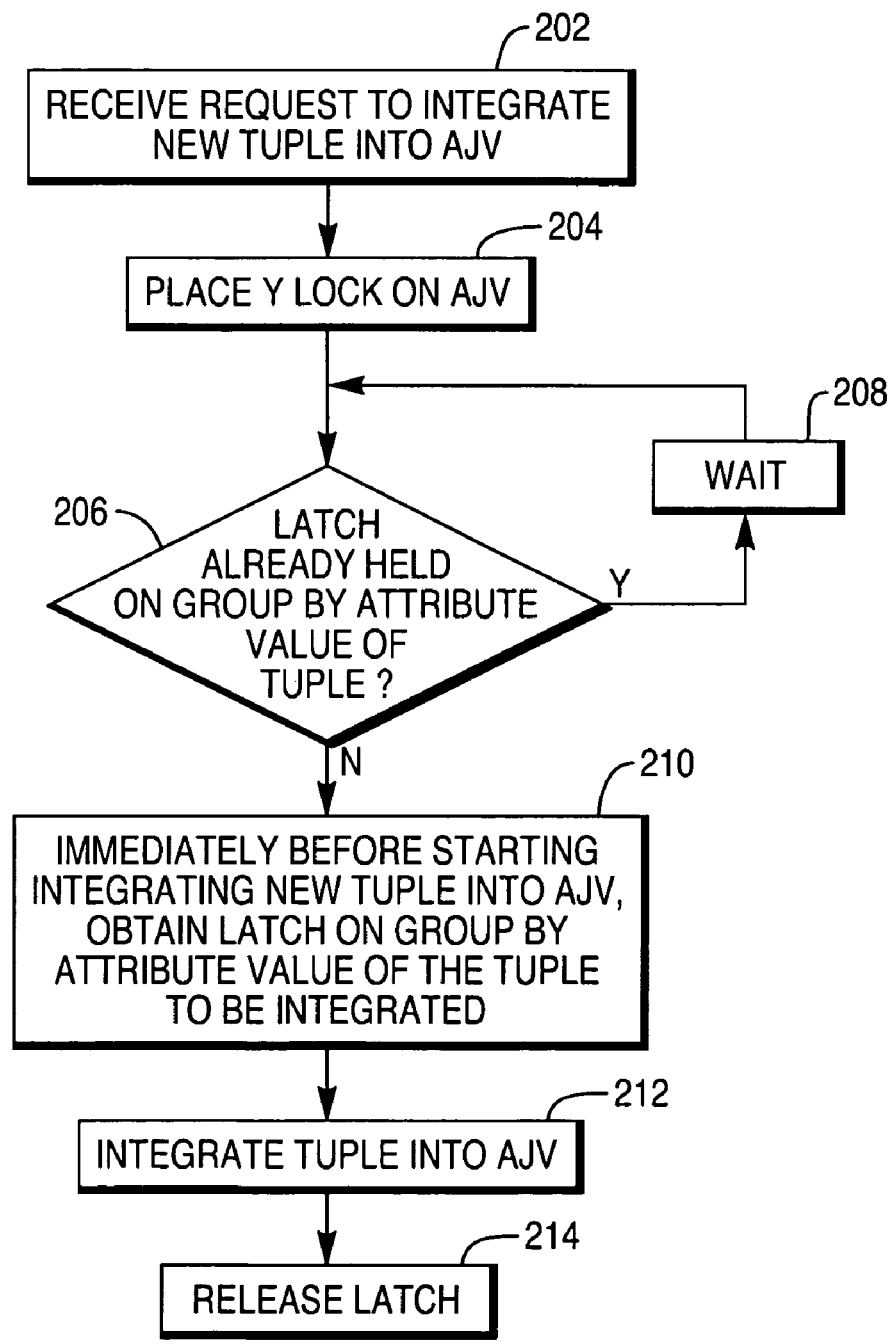
FIG. 8 is a flow diagram of logic to place a latch for integrating a tuple into an aggregate join view.

Transactions use the latches in the latch pool in the manner depicted by FIG. 8. In response to receiving (at 202) a request to integrate a new join result tuple t into an aggregate join view AJV (e.g., due to insertion of a tuple into some base relation of AJV), a Y lock is first placed (at 204) by the lock manager 15 (FIG. 1) on AJV that will be held until the transaction commits or aborts. The data server module 12 next determines (at 206) if a latch already is held on the group-by attribute value of the tuple to be integrated. If a latch is already held on this group-by attribute value, the transaction waits (at 208) until the latch is released. An existing latch on this group-by attribute value is an indication that some other requester is attempting to integrate another tuple with the same group-by attribute value into the aggregate join view AJV. Immediately before the start of the tuple integration into AJV, a latch is requested (at 210) on the group-by attribute value of tuple t. After integrating (at 212) tuple t into the aggregate join view AJV, the latch on the group-by attribute value of tuple t is released (at 214).

To remove a join result tuple from the aggregate join view AJV (e.g., due to deletion from some base relation of AJV), only a Y lock needs to be placed on AJV that will be held until the transaction commits/aborts.

In this way, during aggregate join view maintenance, high concurrency is guaranteed by the fact that Y locks are compatible with themselves. Note that when using Y locks, multiple transactions may concurrently update the same tuple in the aggregate join view. Hence, logical undo is used on the aggregate join view AJV if the transaction updating AJV aborts.

The split group duplicate problem cannot occur if the system uses the latches in the latch pool in the way mentioned above. By enumerating all possible cases, the split group duplicate problem will only occur under the following conditions: (1) two transactions integrate two new join result tuples into the aggregate join view AJV simultaneously, (2) these two join result tuples belong to the same aggregate group, and (3) no tuple corresponding to that aggregate group currently exists in the aggregate join view AJV. Using the latch in the latch pool, one transaction, say T, updates the aggregate join view AJV first (by inserting a new tuple t with the corresponding group by attribute value into AJV). During the period that transaction T holds the latch on the group by attribute value of tuple t, no other transaction can integrate another join result tuple that has the same group by attribute value as tuple t into the aggregate join view AJV. Then when a subsequent transaction T' updates the view, it will detect the existing tuple t. Hence, transaction T' will aggregate its join result tuple that has the same group by attribute value as tuple t into tuple t (rather than inserting a new tuple into AJV).

V. Locking Mechanism in the Presence of B-Tree Indexes Maintained for Materialized Views To enhance database system performance, indexes can be maintained on materialized views. An index is a data structure that contains an arrangement of data values of one or more attributes, usually in some predetermined order (e.g., ascending order, descending order, and so forth). Row identifiers are often associated with the attribute values in the index to enable the database system to more quickly find a row (or rows) in a table that contains a given attribute value. Examples of indexes include hash indexes, B-tree indexes, and other types of indexes. If a hash index is maintained on a materialized view, the Y-lock locking mechanism discussed above can be used to maintain concurrency and data integrity of the information stored in a materialized view without modification. However, if a B-tree index is used, a special mechanism needs to be implemented to avoid the split group duplicate problem.

As used here, a "B-tree index" generally refers to the multiple variants of the B-tree index, including the $B^+$-tree index. A B-tree index is a type of tree-indexing structure, which includes a set of linked "nodes." Each non-leaf node is of the following format: (pointer 0, key 1, pointer 1, key 2, pointer 2, . . . , key n, pointer n). n may be different for each non-leaf node but is always less than some specified number. Each pointer points to a lower-level node. For any given non-leaf node in the B-tree, pointer 0 points to a sub-tree containing all keys less than key 1. For $1 \leq i \leq n-1$, pointer i points to a sub-tree containing all keys between key i and key i+1. Pointer n points to a sub-tree containing all keys greater than key n. The highest level node in the B-tree is its root, which points to children nodes, which in turn may point to more children nodes depending on the depth of the tree. The lowest level nodes have no children, and these nodes are referred to as "leaf nodes." Each leaf node of a B-tree holds one or multiple entries (up to some specified maximum number). Each entry in the leaf node is of the following format: (key value, a list of row identifiers). Each row identifier points to a row of a table (such as a materialized view) on which the B-tree index is maintained and the indexed attribute(s) of the row has the corresponding key value. Alternatively, each entry in the leaf can also be of the following format: (key value, list of rows). In this alternative format, the "list of rows" refers to the actual rows being stored in the B-tree index. In the following discussion, the focus will be on B-tree indexes according to the first format. Note that embodiments of the invention can be used with B-tree indexes according to the latter format.

As noted above, when using a B-tree index with a materialized view, the split group duplicate problem may occur under certain circumstances. With the Y-lock locking mechanism, Y locks are used to replace X locks when a view is updated. An important property of Y locks is that they do not conflict with each other while they do conflict with S and X locks. The main reason that Y locks work for views is due to the fact that the addition operation for each of the COUNT, SUM, and AVG aggregate operators is both commutative and associative. However, Y locks allow multiple transactions to concurrently update the same tuple in an aggregate join view AJV. This may lead to the split group duplicate problem resulting from the insertion/deletion of data into or from aggregate join views.

This split group duplicate problem associated with a B-tree index and aggregate join view is explained in the context of the following example. Suppose the schema of the aggregate join view AJV is (a, b, SUM(c)). A B-tree index $I_B$ is built on attribute a of the aggregate join view AJV. Also, assume there is no tuple with attribute a=1 and b=2 in the aggregate join view AJV. Consider the following two transactions T and T'. Transaction T integrates a new join result tuple $t_1$ (1, 2, 3) into the aggregate join view AJV (by insertion into some base relation of AJV). Transaction T' integrates another new join result tuple $t_3$ (1, 2, 4) into the aggregate join view AJV (by insertion into some base relation of AJV).

It is also assumed that Y value locks are used (instead of X value locks), with the two transactions T and T' executed in the following way:

(1) Transaction T gets a Y value lock for a=1 on the B-tree index $I_B$ of AJV. Transaction T searches the row ID list (lists of row identifiers) in the entry for a=1 of the B-tree index $I_B$. Transaction T finds that no tuple $t_2$ whose attributes $t_2.a=1$ and $t_2.b=2$ exists in AJV.

(2) Transaction T' gets a Y value lock for a=1 on the B-tree index $I_B$ of AJV. Transaction T' searches the row ID list in the entry for a=1 of the B-tree index $I_B$. Transaction T' finds that no tuple $t_2$ whose attributes $t_2.a=1$ and $t_2.b=2$ exists in AJV.

(3) Transaction T inserts a new tuple $t_1$=(1, 2, 3) into AJV. Also, transaction T inserts the row ID of tuple $t_1$ into the row ID list in the entry for a=1 of the B-tree index $I_B$ (4) Transaction T' inserts a new tuple $t_3$=(1, 2, 4) into AJV. Also, transaction T' inserts the row ID of tuple $t_3$ into the row ID list in the entry for a=1 of the B-tree index $I_B$.

Now the aggregate join view AJV contains two tuples (1, 2, 3) and (1, 2, 4) instead of a single tuple (1, 2, 7), which is not correct. This is the split group duplicate problem.

To address the issue of the split group duplicate problem in the presence of B-tree indexes, two kinds of Y locks are defined. The first kind of Y lock is described above in Section III. The second kind of Y lock is identical to the first kind of Y lock, except that the second kind of Y lock is augmented by a latch. There are four kinds of (value) locks according to some embodiments: S, X, first kind of Y, and second kind of Y. S locks are used for reads. X locks are used for both reads and writes. The first kind of Y lock is used for removing a join result tuple from the AJV, and the second kind of Y lock, along with a latch, is used for integrating a join result tuple into the AJV. In the case that a B-tree index exists on the aggregate join view AJV, these locks are key range locks.

The key-range locking technique includes a previous-key locking technique or a next-key locking technique. The basic idea of a previous-key locking technique is to lock both the current key and the previous key when locking of a range of keys is requested. Similarly, for next-key locking, both the current key and the next key is locked when locking of a key range is performed. However, conventional key-range locking techniques cannot be extended to the Y-lock locking mechanism without modification. In accordance with some embodiments of the invention, a key-range locking mechanism that employs Y locks and other locks (e.g., X lock, S lock) is provided.

To implement Y locks on aggregate join views associated with B-tree indices correctly, a modified form of key range locking is implemented along with logical deletion of keys and with the use of the latch pool mechanism. There are various operations that require placing locks on a B-tree index associated with a materialized view. A first operation is the fetch operation. In the fetch operation, given a key value $v_1$, the row identifier(s) associated with the key value $v_1$ is retrieved from the B-tree index if the key value $v_1$ exists in the B-tree index. For example, a read operation may request a row that contains the key value $v_1$, in which case the fetch operation is performed. Another operation is the fetch next operation. In the fetch next operation, given a current key value $v_1$, the next key value $v_2 > v_1$ that exists in the B-tree index is located, and the row identifier(s) associated with the key value $v_2$ is fetched. A fetch next operation is performed when a read request is received that requests rows containing key values between a certain range, such as between $v_1$ and $v_1+10$. In this example, if the key $v_1$ exists in the B-tree index, then a fetch operation is used to fetch the row identifier(s) associated with the key value $v_1$. To obtain the remaining row identifiers in the B-tree index associated with key values within the specified range, one or more fetch next operations are invoked to fetch the row identifiers of key values that are greater than $v_1$ in the specified range.

Other operations require that an X value lock be placed on the key value $v_1$. The X value lock is placed on key value $v_1$ if a transaction requests both a read and a write of rows containing the key value $v_1$. Some other operations cause a first kind of Y value lock to be placed on key value $v_1$. A first kind of Y value lock is placed on the key value $v_1$ in response to request to remove rows containing the key value $v_1$. Other operations cause a second kind of Y value lock to be placed on key value $v_1$. A second kind of Y value lock is placed on key value $v_1$ in response to requests to integrate a new row into the materialized join view.

Thus, there are 5 operations of interest that involve placement of locks on the B-tree index: a fetch operation; a fetch next operation; placing an X value lock on a given key value; placing a first kind of Y value lock on a given key value; and placing a second kind of Y value lock on a given key value. A latch according to some embodiments is also placed in response to placing the second kind of Y value lock.

The following provides examples of what occurs in response to insert and delete transactions. Assume a B-tree index is built on an attribute a of the aggregate join view AJV, and a row is inserted into some base relation of AJV. The insertion of this row into the base relation of AJV causes a new join result tuple t to be integrated into the aggregate join view AJV. The procedure to integrate the join result tuple t into the aggregate join view AJV is as follows. To integrate a new join result tuple t into an aggregate join view AJV, the database system first places a second kind of Y value lock on the B-tree index. If a latch on the group-by attribute value of the tuple t is not held by another requester, then the database system obtains a latch on the group-by attribute value of the tuple t that is to be integrated into AJV. After integrating tuple t into the aggregate join view AJV, the latch on the group-by attribute value of tuple t is released.

To remove a join result tuple from the aggregate join view AJV, such as due to deletion of a tuple from some base relation of AJV, only a first kind of Y value lock needs to be placed on the B-tree index.

If the aggregate group of tuple t exists in AJV (which is determined by reading the B-tree index and AJV by using the fetch operation), then the aggregate group of AJV is updated based on information in the join result tuple t. However, if the aggregate group of tuple t does not exist in AJV, then a new tuple for the aggregate group of tuple t is inserted into AJV. Thus, the database system does not know whether it needs to update an existing aggregate group in AJV or insert a new aggregate group into AJV until the database system reads from AJV. A second kind of Y value lock for t.a is placed on the aggregate join view AJV, in combination with a latch, to integrate tuple t into AJV.

Another transaction is a delete transaction that involves deleting a tuple of some base relation of AJV. For each corresponding join result tuple t, the following is performed to remove tuple t from the aggregate join view AJV. First, the aggregate group of tuple t in AJV is located (by reading the B-tree index and AJV using the fetch operation). The aggregate group in AJV is then updated. If all join result tuples have been removed from the aggregate group, then the aggregate group is deleted from the AJV. In this case, the database system does not know whether it needs to update an aggregate group in the AJV or delete an aggregate group from the AJV in advance. However, the database system knows that it needs to acquire a Y value lock for t.a on the AJV before the database system can remove tuple t from the aggregate join view AJV.

Other transactions will invoke one or more of the five operations discussed above.

Figure 9:
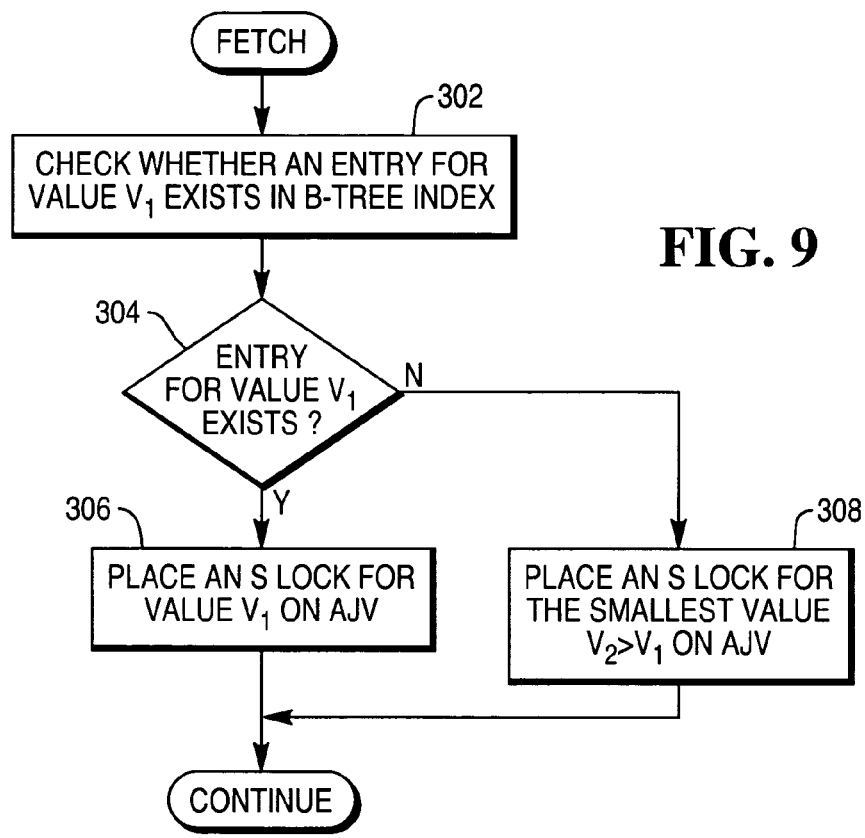
FIG. 9 is a flow diagram of a fetch operation.

A locking algorithm for implementing value locks for aggregate join views on B-tree indices is implemented as follows, in accordance with one embodiment. Reference is made primarily to next key locking in the following discussion. However, note that previous key locking can be used in other embodiments. As shown in FIG. 9, in a fetch operation of rows containing value $v_1$, the database system checks (at 302) whether some entry for value $v_1$ exists in the B-tree index. If such an entry exists, as determined (at 304), an S lock for value $v_1$ is placed (at 306) on the aggregate join view AJV. If no entry for value $v_1$ exists in the B-tree index, then an S lock for value $v_2$ is placed (at 308) on the aggregate join view AJV for the smallest value $v_2$ where $v_2 > v_1$. This is a modified form of key range locking, and more specifically, next key locking. If previous key locking is employed, then the S lock for value $v_2$ is placed for the largest value $v_2$ where $v_2 < v_1$. In the modified form of key range locking, an S lock is placed on the next key (or previous key) only if the entry for $v_1$ does not exist in the B-tree index.

Figure 10:
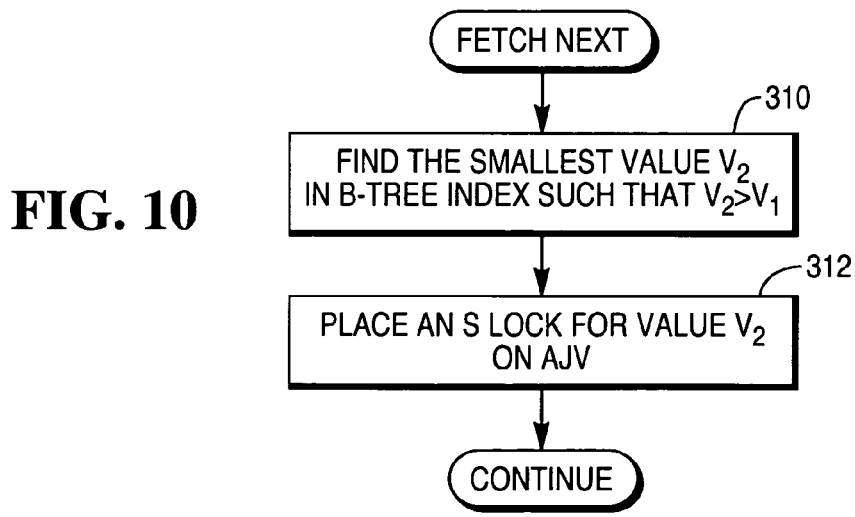
FIG. 10 is a flow diagram of a fetch next operation.

As shown in FIG. 10, for a fetch next operation, the database system finds (at 310) the smallest value $v_2$ in the B-tree index such that $v_2 > v_1$. An S lock for value $v_2$ is placed (at 312) on the aggregate join view AJV.

Figure 11:
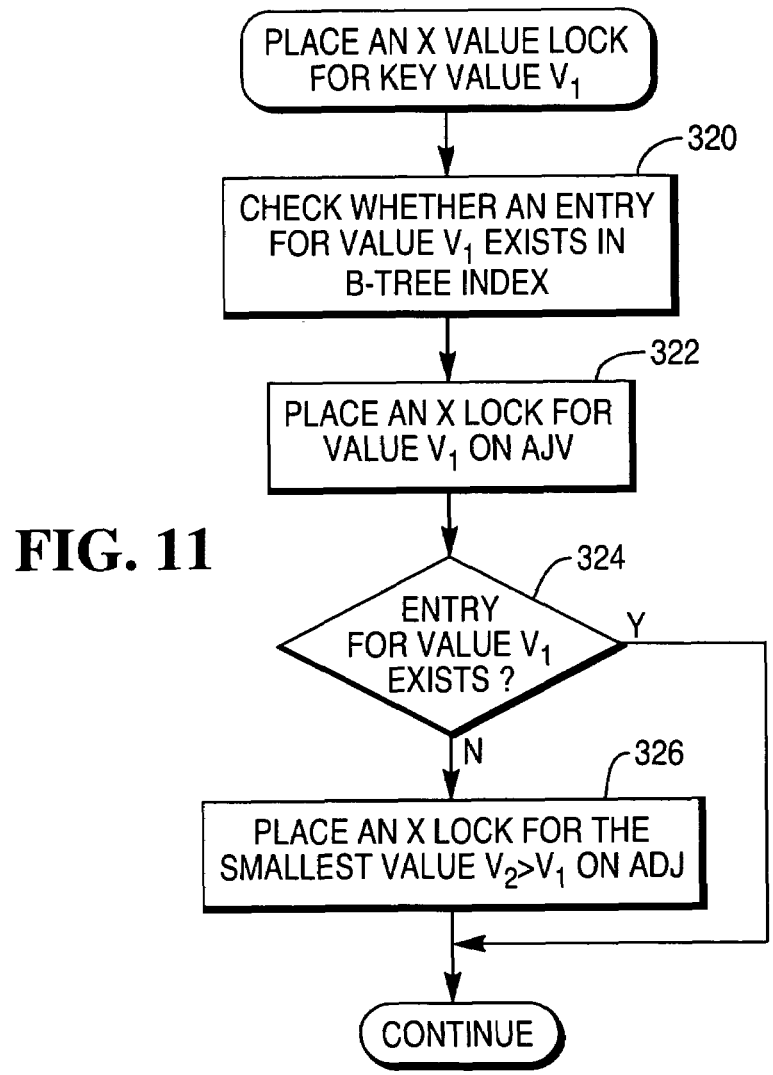
FIG. 11 is a flow diagram of an operation that places an exclusive (X) lock on an aggregate join view.

As shown in FIG. 11, in an operation that involves placing an X value lock for a key value $v_1$, the database system first checks (at 320) whether there is some entry for value $v_1$ in the B-tree index. In any event, an X lock for value $v_1$ is placed (at 322) on the aggregate join view AJV. If no entry for value $v_1$ exists in the B-tree index, as determined (at 324), an X lock for value $v_2$ is placed (at 326) on the aggregate join view AJV for the smallest value $v_2$ where $v_2 > v_1$.

Figure 12:
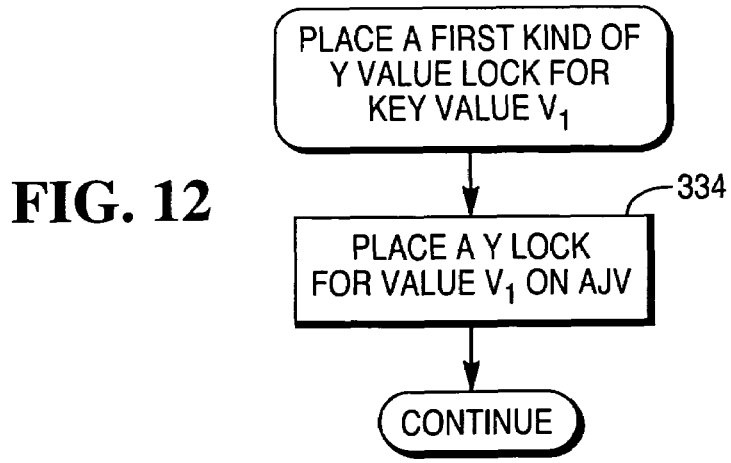
FIG. 12 is a flow diagram of an operation that places a first kind of Y value lock on an aggregate join view.

Another possible operation in the database system is the operation that involves placing a first kind of Y lock for a key value $v_1$, as shown in FIG. 12. In this case, a Y lock for value $v_1$ is placed (at 334) on the aggregate join view AJV.

Figure 13:
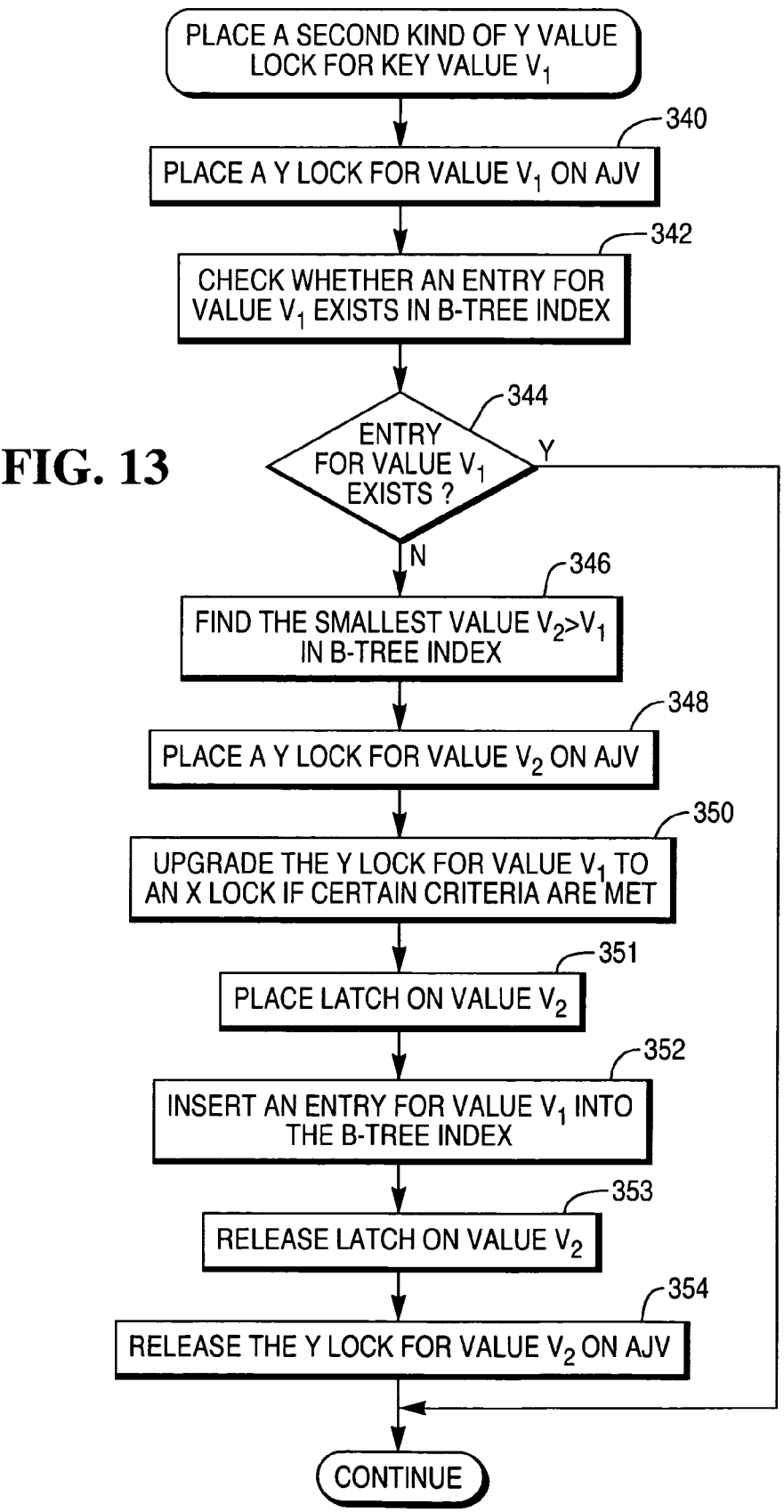
FIG. 13 is a flow diagram of an operation that places a second kind of Y value lock on an aggregate join view.

Yet another operation that can occur in a database system is an operation that requires a second kind of Y value lock to be placed for key value $v_1$, as shown in FIG. 13. In this case, a Y lock for value $v_1$ is placed (at 340) on the aggregate join view AJV. Then the database system checks (at 342) whether some entry for value $v_1$ exists in the B-tree index. If no entry for value $v_1$ exists in the B-tree index, as determined (at 344), then the following operations are performed. The database system finds (at 346) the smallest value $v_2$ in the B-tree index such that $v_2 > v_1$. A Y lock for value $v_2$ is then placed (at 348) on the aggregate join view AJV. If the Y lock for value $v_2$ on the B-tree index is acquired as an X lock, the database system upgrades (at 350) the Y lock for value $v_1$ on the B-tree index to an X lock. This situation may happen when transaction T already holds an S or X lock for value $v_2$ on the aggregate join view AJV.

Next, the database system requests (at 351) a latch for value $v_2$. The database system then inserts (at 352) into the B-tree index an entry for value $v_1$ with an empty row ID list. Note that at a later time, transaction T will insert a row identifier into this row ID list after transaction T inserts the corresponding tuple into the aggregate join view AJV. The database system next releases (at 353) the latch for value $v_2$. The short-term Y lock for value $v_2$ is then released (at 354) on the aggregate join view AJV.

If, however, the database system determines (at 344) that an entry for value $v_1$ already exists, then key-range locking as performed at 346-354 is not performed.

Table 3 summarizes the locks acquired during the different operations discussed above (assuming next key locking is performed).

TABLE 3

|  |  | current key $v_1$ | next key $v_2$ |
|---|---|---|---|
| fetch | $v_1$ exists | S |  |
|  | $v_1$ does not exist |  | S |
| fetch next |  |  | S |
| X value lock | $v_1$ exists | X |  |
|  | $v_1$ does not exist | X | X |
| first kind of Y value lock |  | Y |  |
| second kind of Y value lock | $v_1$ exists | Y |  |
|  | $v_1$ does not exist and the Y lock on $v_2$ is acquired as a Y lock | Y | Y |
|  | $v_1$ does not exist and the Y lock on $v_2$ is acquired as an X lock | X | X |

During the period that a transaction T holds a first kind of Y (or a second kind of Y, or X) value lock for key value $v_1$, if transaction T desires to delete the entry for value $v_1$, transaction T performs a logical deletion of keys from the B-tree index instead of a physical deletion. In other words, instead of removing the entry for value $v_1$ from the B-tree index, the database system leaves the entry for value $v_1$ in the B-tree index, but sets a flag (referred to as DELETE_FLAG). In one implementation, the DELETE_FLAG indicator is set to a logical 1 value. If the delete is to be rolled back, e.g., transaction T is terminated for some reason, then the DELETE_FLAG indicator is reset (e.g., to the logical value 0). When DELETE_FLAG is set, if another transaction inserts an entry for value $v_1$ into the B-tree index before the entry for value $v_1$ is removed, the DELETE_FLAG indicator for the value $v_1$ is reset to 0.

The physical deletion of keys is performed as "garbage collection" by other operations (of other transactions) that happen to pass through the affected nodes (i.e., nodes with DELETE_FLAG set) in the B-tree index. This process of physically deleting from a node those entries marked with a set DELETE_FLAG is referred to as node reorganization. A node reorganization removes all entries from a leaf node of a B-tree index that have been marked deleted and currently no transaction holds any lock on such entries.

In accordance with some embodiments of the invention, a special short-term Z lock mode is implemented to enable the deletion of entries that are marked with a set DELETE_FLAG. A Z lock mode is not compatible with any lock mode (including itself). A transaction T can get a Z lock on an object if no transaction (including transaction T itself) is currently holding any lock on the object. Also, during the period that transaction T holds a Z lock on an object, no transaction (including transaction T itself) can be granted another lock (including Z lock) on this object.

Note that the Z lock mode is different from the X lock mode. For example, if transaction T itself is currently holding an S lock on an object, transaction T can still get an X lock on the object if no other transaction is currently holding any lock on the object. On the other hand, once a transaction T is holding an S lock on an object, it cannot obtain a Z lock on the object.

For each entry with value v whose DELETE_FLAG is set to 1, a conditional Z lock for value v is requested. If the conditional Z lock request is granted, this entry is deleted from the leaf node of the B-tree index. After deletion of the entry, the Z lock is released. However, if the conditional Z lock request is denied, nothing further is done with the entry. The physical deletion of this entry is left to other future operations.

The Z lock (instead of X lock) is used to prevent the following undesirable situation from occurring. A transaction that is currently using an entry (e.g., holding an S lock on the entry), where the entry is marked logically deleted, tries to physically delete the entry. Use of the Z lock mode simplifies the key-range locking protocol for aggregate join views on B-tree indices.

As a further note, in operations that require a Y value lock on key value $v_1$, the situation where no entry for value $v_1$ exist in the B-tree index does not occur often. To illustrate this, consider an aggregate join view AJV that is defined on base relation R and several other base relations. Suppose a B-tree index $I_B$ is built on attribute d of the aggregate join view AJV. If a new tuple t is inserted into base relation R and several new join result tuples are generated, the corresponding transaction needs to acquire appropriate second kind of Y value locks on the B-tree index $I_B$ before the transaction can integrate these new join result tuples into the aggregate join view AJV. If the transaction deletes a tuple t from base relation R, to maintain the aggregate join view AJV, normally the transaction needs to first compute the corresponding join result tuples that are to be removed from the aggregate join view AJV. These join result tuples must have been integrated into the aggregate join view AJV before. Thus, when the transaction acquires Y value locks for their d attribute values, these d attribute values usually are present in the B-tree index $I_B$. However, there is an exception. Suppose attribute d of the aggregate join view AJV comes from base relation R, and there is only one tuple t in base relation R whose attribute d=v. However, there is no matching tuple in the other base relations of the aggregate join view AJV that can be joined with tuple t. Thus, there is no tuple in the aggregate join view AJV whose attribute d=v. Suppose transaction T executes the following SQL statement:

DELETE
FROM R
WHERE R.d=v;

In this case, to maintain the aggregate join view AJV, there is no need for transaction T to compute the corresponding join result tuples that are to be removed from the aggregate join view AJV. Transaction T can execute the following operation directly:

DELETE
FROM AJV
WHERE AJV.d=v;

Then when transaction T requests a Y value lock for d=v on the B-tree index $I_B$, transaction T will find that no entry for value v exists in the B-tree index $I_B$. In this case, transaction T has another choice—requesting an X (instead of Y) value lock for d=v on the B-tree index $I_B$.

The following briefly explains the correctness (serializability) of the key-range locking algorithm for aggregate join views on B-tree indices as described above. Suppose a B-tree index $I_B$ is built on attribute d of an aggregate join view AJV. For any value v, it can be shown below that there is no read-write or write-read conflict between two different transactions on those tuples of the aggregate join view AJV whose attribute d has value v. Write-write conflicts are avoided by the locks on the base relations and the commutative and associative properties of the addition operation. Furthermore, the use of latches in the latch pool guarantees that for each aggregate group, at any time, at most one tuple corresponding to this group exists in the aggregate join view AJV.

Consider the following two transactions T and T'. Transaction T updates (some of) the tuples in the aggregate join view AJV whose attribute d has value $v_1$. Transaction T' reads the tuples in the aggregate join view AJV whose attribute d has value $v_1$ (e.g., through a range query). Assume $v_2$ is the smallest existing value in the B-tree index $I_B$ such that $v_2 > v_1$. Transaction T needs to get a first kind of Y (or second kind of Y, or X) value lock for $d=v_1$ on the B-tree index $I_B$ of AJV. Transaction T' needs to get an S value lock for $d=v_1$ on the B-tree index $I_B$ of AJV. There are four possible cases:

Case 1: An entry E for value $v_1$ already exists in the B-tree index $I_B$. Also, transaction T' gets the S value lock for $d=v_1$ on the B-tree index $I_B$ of AJV first. To put an S value lock for $d=v_1$ on the B-tree index $I_B$, transaction T' needs to put an S lock for $d=v_1$ on AJV. During the period that transaction T' holds the S lock for $d=v_1$ on AJV, the entry E for value $v_1$ always exists in the B-tree index $I_B$. Then during this period, transaction T cannot get the first kind of Y (or second kind of Y, or X) lock for $d=v_1$ on AJV. That is, transaction T cannot get the first kind of Y (or second kind of Y, or X) value lock for $d=v_1$ on the B-tree index $I_B$ of AJV.

Case 2: An entry E for value $v_1$ already exists in the B-tree index $I_B$. Also, transaction T gets a first kind of Y (or a second kind of Y, or X) value lock for $d=v_1$ on the B-tree index $I_B$ of AJV first. To put a first kind of Y (or a second kind of Y, or X) value lock for $d=v_1$ on the B-tree index $I_B$, transaction T needs to put a Y (or Y, or X) lock for $d=v_1$ on AJV. During the period that transaction T holds the first kind of Y (or second kind of Y, or X) lock for $d=v_1$ on AJV, the entry E for value $v_1$ always exists in the B-tree index $I_B$. Note during this period, if some transaction deletes the entry E for value $v_1$ from the B-tree index $I_B$, the entry E is only logically deleted. Only after transaction T releases the Y (or Y, or X) lock for $d=v_1$ on AJV may the entry E for value $v_1$ be physically deleted from the B-tree index $I_B$. Thus, during the period that transaction T holds the Y (or Y, or X) lock for $d=v_1$ on AJV, transaction T' cannot get the S lock for $d=v_1$ on AJV. That is, transaction T' cannot get the S value lock for $d=v_1$ on the B-tree index $I_B$ of AJV.

Case 3: No entry for value $v_1$ exists in the B-tree index $I_B$. Also, transaction T' gets the S value lock for $d=v_1$ on the B-tree index $I_B$ of AJV first. To put an S value lock for $d=v_1$ on the B-tree index $I_B$, transaction T' needs to put an S lock for $d=v_2$ on AJV. During the period that transaction T' holds the S lock for $d=v_2$ on AJV, no other transaction T" can insert an entry for value $v_3$ into the B-tree index $I_B$ such that $v_1 \leq v_3 \leq v_2$. This is because to do so, transaction T" needs to get a Y (or X) lock for $d=v_2$ on AJV. Then during the period that transaction T' holds the S lock for $d=v_2$ on AJV, transaction T cannot get the second kind of Y (or X) value lock for $d=v_1$ on the B-tree index $I_B$ of AJV. This is because to do so, transaction T needs to get a Y (or X) lock for $d=v_2$ on AJV. Note during the period that transaction T' holds the S lock for $d=v_2$ on AJV, transaction T can get the first kind of Y value lock for $d=v_1$ on AJV. However, during this period, transaction T cannot use the first kind of Y value lock for $d=v_1$ on the B-tree index to do any update. This is because no entry for value $v_1$ exists in the B-tree index, and transaction T cannot use the first kind of Y value lock for $d=v_1$ to insert an entry for value $v_1$ into the B-tree index. Hence, there is no read-write conflict between transaction T and transaction T' on $d=v_1$. Also, if transaction T' itself inserts an entry for value $v_3$ into the B-tree index $I_B$ such that $v_1 \leq v_3 < v_2$, transaction T' will hold an X lock for $d=v_3$ on AJV. Then transaction T still cannot get the second kind of Y (or X) value lock for $d=v_1$ on the B-tree index $I_B$ of AJV before transaction T' finishes execution. (If $v_1=v_3$, then transaction T cannot get the first kind of Y value lock for $d=v_1$ on the B-tree index $I_B$ before transaction T' finishes execution. If $v_1 < v_3$, transaction T cannot use the first kind of Y value lock for $d=v_1$ on the B-tree index $I_B$ to do any update.)

Case 4: No entry for value $v_1$ exists in the B-tree index $I_B$. Also, transaction T gets the first kind of Y (or second kind of Y, or X) value lock for $d=v_1$ on the B-tree index $I_B$ of AJV first. In this case, there are three possible scenarios:

(a) Transaction T gets the first kind of Y value lock for $d=v_1$ on the B-tree index $I_B$ of AJV first. Hence, transaction T puts a Y lock for $d=v_1$ on AJV. During the period that transaction T holds the Y lock for $d=v_1$ on AJV, another transaction T'' can insert an entry for value $v_1$ into the B-tree index $I_B$. Note that T''≠T, as transaction T cannot use a first kind of Y value lock for $d=v_1$ to insert any entry for value $v_1$ into the B-tree index $I_B$. Before transaction T'' inserts an entry for value $v_1$ into the B-tree index $I_B$, no entry for value $v_1$ exists in the B-tree index $I_B$, so transaction T cannot use the first kind of Y value lock for $d=v_1$ to perform any update. Hence, there is no write-read conflict between transaction T and transaction T' on $d=v_1$. After transaction T'' inserts an entry for value $v_1$ into the B-tree index $I_B$, the entry for value $v_1$ cannot be physically deleted from the B-tree index $I_B$ before transaction T releases the Y value lock for $d=v_1$. As a result, during this period, transaction T' cannot get the S value lock for $d=v_1$ on the B-tree index $I_B$ of AJV since transaction T' cannot put an S lock for $d=v_1$ on AJV.

(b) Transaction T gets the second kind of Y value lock for $d=v_1$ on the B-tree index $I_B$ of AJV first. Thus, transaction T puts a Y lock for $d=v_1$ and another Y lock for $d=v_2$ on AJV. Also, transaction T inserts a new entry for value $v_1$ into the B-tree index $I_B$. Before transaction T inserts the new entry for value $v_1$ into the B-tree index $I_B$, transaction T holds the Y lock and the latch for $d=v_2$ on AJV. During this period, no other transaction T'' can insert an entry for value $v_3$ into the B-tree index $I_B$ such that $v_1 \leq v_3 < v_2$. This is because to do so, transaction T'' needs to get a latch (or X lock) for $d=v_2$ on AJV. Then during this period, transaction T' cannot get the S value lock for $d=v_1$ on the B-tree index $I_B$ of AJV. This is because to do so, transaction T' needs to get an S lock for $d=v_2$ on AJV. After transaction T inserts the new entry for value $v_1$ into the B-tree index $I_B$, transaction T will hold a Y lock for $d=v_1$ on AJV until transaction T finishes execution. Then during this period, transaction T' still cannot get the S value lock for $d=v_1$ on the B-tree index $I_B$ of AJV. This is because to do so, transaction T' needs to get an S lock for $d=v_1$ on AJV.

(c) Transaction T gets the X value lock for $d=v_1$ on the B-tree index $I_B$ of AJV first. Thus, transaction T puts an X lock for $d=v_1$ and another X lock for $d=v_2$ on AJV. During the period that transaction T holds the two X locks for $d=v_1$ and $d=v_2$ on AJV, no other transaction T'' can insert an entry for value $v_3$ into the B-tree index $I_B$ such that $v_1 \leq v_3 < v_2$. This is because to do so, transaction T'' needs to get a Y (or X) lock for $d=v_2$ on AJV. Then during the period that transaction T holds the two X locks for $d=v_1$ and $d=v_2$ on AJV, transaction T' cannot get the S value lock for $d=v_1$ on the B-tree index $I_B$ of AJV. This is because to do so, depending on whether transaction T has inserted a new entry for value $v_1$ into the B-tree index $I_B$ or not, transaction T' needs to get an S lock for either $d=v_1$ or $d=v_2$ on AJV.

In the above three scenarios, the situation that transaction T itself inserts an entry for value $v_3$ into the B-tree index $I_B$ such that $v_1 \leq v_3 < v_2$ can be discussed in a way similar to Case 3.

Thus, for any value $v_1$, there is no read-write or write-read conflict between two different transactions on those tuples of the aggregate join view AJV whose attribute d has value $v_1$.

Implementing the Y-lock locking mechanism for non-aggregate join views in the presence of a B-tree index is also tricky. Suppose S, X, and Y value locks (but not a latch) are implemented for non-aggregate join views on B-tree indices. Also, suppose a B-tree index is built on attribute a of a non-aggregate join view JV. Then to insert a new join result tuple t into the non-aggregate join view JV, a Y value lock for t.a is first placed on the B-tree index. If no entry for t.a exists in the B-tree index, the database system finds the smallest value $v_2$ in the B-tree index such that $v_2 > t.a$ and places an X lock for value $v_2$ on the B-tree index. The X lock for value $v_2$ on the B-tree index cannot be downgraded to a Y lock. Thus, this X lock greatly reduces concurrency. However, the X lock for value $v_2$ on the B-tree index cannot be replaced by a Y lock.

To implement value locks for non-aggregate join views on B-tree indices with high concurrency, the latch pool mechanism is utilized and non-aggregate join views are treated in the same way as aggregate join views. For non-aggregate join views, the database system uses four kinds of value locks: S, X, first kind of Y, and second kind of Y. For example, suppose a B-tree index is built on attribute a of a non-aggregate join view JV. To insert a new join result tuple t into the non-aggregate join view JV, a second kind of Y value lock for t.a is placed on the B-tree index, as described above for the aggregate join view. To delete a join result tuple t from the non-aggregate join view JV, a Y value lock (but not a latch) for t.a is first placed on the B-tree index. For non-aggregate join views, all the four different kinds of value locks (S, X, first kind of Y, and second kind of Y) can be implemented on B-tree indices in the same way as described above for the aggregate join views. The only difference is that the latch on the group-by attribute value of tuple t is not needed. However, the latch is still placed on the next key in the B-tree index, as discussed above. For non-aggregate join views, the latches in the latch pool are used for a different purpose than for aggregate join views.

VI. System Environment

Instructions of the various software routines or modules discussed herein (such as the parsing engine 16, data server modules 12, and so forth) are stored on one or more storage devices in the corresponding systems and loaded for execution on corresponding control units or processors. The control units or processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software routines or modules) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

The instructions of the software routines or modules are loaded or transported to each system in one of many different ways. For example, code segments including instructions stored on floppy disks, CD or DVD media, a hard disk, or transported through a network interface card, modem, or other interface device are loaded into the system and executed as corresponding software modules or layers. In the loading or transport process, data signals that are embodied in carrier waves (transmitted over telephone lines, network lines, wireless links, cables, and the like) communicate the code segments, including instructions, to the system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a database system, comprising:
   receiving a transaction that causes a tuple to be integrated into a join view;
   in response to receiving the transaction, placing a predefined first lock on at least a portion of the join view, the predefined first lock conflicting with either a shared lock or an exclusive lock placed on the join view, but not conflicting with another predefined first lock placed on the join view; and
   obtaining a latch associated with a value of a predetermined attribute of the tuple before integrating the tuple into the join view.

2. The method of claim 1, further comprising releasing the latch associated with the predetermined attribute value of the tuple after integrating the tuple into the join view.

3. The method of claim 1, further comprising storing a pool of latches,
   wherein obtaining the latch associated with the predetermined attribute value of the tuple comprises obtaining one of the latches in the pool.

4. The method of claim 3, wherein storing the pool comprises storing the pool in volatile memory.

5. The method of claim 3, further comprising applying a hash function on the predetermined attribute value of the tuple to derive a pointer to a location in the pool corresponding to the obtained latch.

6. The method of claim 3, further comprising:
   during a period that the transaction holds the latch associated with a value of the predetermined attribute of the tuple, the database system not requesting another latch from the pool.

7. The method of claim 3, further comprising:
   prior to obtaining the latch associated with a value of the predetermined attribute of the tuple, the database system releasing all other latches held by the transaction.

8. The method of claim 3, further comprising:
   during a period that the transaction holds the latch associated with a value of the predetermined attribute of the tuple, the database system not requesting another lock for the transaction.

9. The method of claim 1, wherein receiving the transaction comprises receiving a transaction to cause the tuple to be integrated into an aggregate join view,
   wherein placing the predefined first lock comprises placing the predefined first lock on at least a portion of the aggregate join view, and
   wherein obtaining the latch associated with the predetermined attribute value of the tuple comprises obtaining the latch associated with a group-by attribute value of the tuple.

10. The method of claim 1, wherein the join view is a materialized join view containing the results of a join of plural base tables, and
    wherein the predefined first lock is placed in at least the portion of the materialized join view that contains results of the join of the plural base tables.

11. An article comprising at least one storage medium containing instructions that when executed cause a database system to:
    receive a transaction that causes a tuple to be integrated into a join view;
    in response to receiving the transaction, place a predefined first lock on at least a portion of the join view, the predefined first lock conflicting with either a shared lock or an exclusive lock placed on the join view, but not conflicting with another predefined first lock placed on the join view; and
    obtain a latch associated with a value of a predetermined attribute of the tuple before integrating the tuple into the join view.

12. The article of claim 11, wherein the instructions when executed cause the database system to further release the latch associated with the predetermined attribute value of the tuple after integrating the tuple into the aggregate join view.

13. The article of claim 11, wherein the instructions when executed cause the database system to further store a pool of latches,
    wherein obtaining the latch associated with the predetermined attribute value of the tuple comprises obtaining one of the latches in the pool.

14. The article of claim 13, wherein the instructions when executed cause the database system to further apply a hash function on the predetermined attribute value of the tuple to derive a pointer to a location in the pool corresponding to the obtained latch.

15. The article of claim 13, wherein the instructions when executed cause the database system to further:
    during a period that the transaction holds the latch associated with a value of the predetermined attribute of the tuple, not request another latch from the pool.

16. The article of claim 13, wherein the instructions when executed cause the database system to further:
prior to obtaining the latch associated with a value of the predetermined attribute of the tuple, release all other latches held by the transaction.

17. The article of claim 13, wherein the instructions when executed cause the database system to further:
during a period that the transaction holds the latch associated with a value of the predetermined attribute of the tuple, not request another lock for the transaction.

18. The article of claim 11, wherein receiving the transaction comprises receiving a transaction to cause the tuple to be integrated into an aggregate join view,
wherein placing the predefined first lock comprises placing the predefined first lock on at least a portion of the aggregate join view, and
wherein obtaining the latch associated with the predetermined attribute value of the tuple comprises obtaining the latch associated with a group-by attribute value of the tuple.

19. The article of claim 11, wherein the database system comprises plural storage modules and plural data server modules to manage access of corresponding plural storage modules,
wherein the instructions when executed cause the database system to further store the join view by distributing the join view across the plural storage modules.

20. The article of claim 19, wherein placing the predefined first lock and obtaining the latch is performed by a first one of the data server modules, wherein the instructions when executed cause the database system to further:
cause a second one of the data server modules to, in response to a second transaction to integrate a second tuple into the join view, place another predefined first lock on at least a portion of the join view; and
cause the second data server module to obtain another latch associated with another value of the predetermined attribute of the second tuple before integrating the second tuple into the join view.

21. A database system, comprising:
a storage to store an aggregate join view; and
a controller to:
receive a transaction that causes a tuple to be integrated into the aggregate join view;
in response to receiving the transaction, place a predefined first lock on at least a portion of the aggregate join view, the predefined first lock conflicting with either a shared lock or an exclusive lock placed on the aggregate join view, but not conflicting with another predefined first lock placed on the aggregate join view; and
obtain a latch associated with a value of a group-by attribute of the tuple before integrating the tuple into the aggregate join view.

22. The database system of claim 21, further comprising a volatile memory to store a pool of latches, wherein the latch associated with the value of the group-by attribute of the tuple is part of the pool.

23. The database system of claim 21, wherein the storage comprises plural storage modules, and wherein the controller comprises plural data server modules to manage access of corresponding plural storage modules,
the data server modules to store the aggregate join view in the storage modules by distributing the aggregate join view across the plural storage modules.

24. The database system of claim 23, a first one of the data server modules to place the predefined first lock and obtain the latch, and a second one of the data server modules to, in response to a second transaction to integrate a second tuple into the join view:
place another predefined first lock on at least a portion of the join view; and
obtain another latch associated with another value of the predetermined attribute of the second tuple before integrating the second tuple into the join view.

* * * * *